(12) United States Patent
Grandchamp et al.

(10) Patent No.: US 6,704,285 B1
(45) Date of Patent: Mar. 9, 2004

(54) SIGNAL MULTIPLEXER AND METHOD (75) Inventors: Brett J. Grandchamp, Cumberland, ME (US); William A. DeCormier, Poland, ME (US)

(73) Assignee: SPX Corporation, Charlotte, NC (US)

( * ) Notice: Subject to any disclaimer, the term of this patent is extended or adjusted under 35 U.S.C. 154(b) by 0 days.

(21) Appl. No.: 09/562,404

(22) Filed: May 1, 2000

Related U.S. Application Data (63) Continuation-in-part of application No. 09/451,000, filed on Nov. 29, 1999, now Pat. No. 6,580,729.

(51) Int. Cl.[7] .............................................. H04L 12/26
(52) U.S. Cl. ...................................... 370/241; 370/497
(58) Field of Search ................................. 370/206, 480, 370/483, 485, 486, 487, 488, 497, 241, 250, 251; 375/260, 322, 350

(56) References Cited

U.S. PATENT DOCUMENTS

| | | | |
|---|---|---|---|
| 4,029,902 A | 6/1977 | Bell, Jr. et al. | 179/15 |
| 4,792,805 A | 12/1988 | Miglia | 342/372 |
| 4,815,075 A | 3/1989 | Cameron | 370/123 |
| 4,847,574 A | 7/1989 | Gauthier et al. | 33/21 |
| 5,163,181 A | 11/1992 | Koontz | 455/103 |
| 5,604,747 A | 2/1997 | Callas | 370/297 |
| 5,663,683 A | 9/1997 | McCandless | 330/286 |
| 5,712,879 A * | 1/1998 | Tatsuta et al. | 375/330 |
| 5,736,907 A | 4/1998 | Chen et al. | 333/113 |
| 5,790,523 A * | 8/1998 | Ritchie et al. | 370/241 |

\* cited by examiner

Primary Examiner—Kwang Bin Yao
(74) Attorney, Agent, or Firm—Baker & Hostetler, LLP (57) ABSTRACT

A signal multiplexer for N channel signals of different frequency bands that utilizes only N+1 hybrid couplers and presents a constant impedance to the transmitters that supply the N channel signals. The channel signals are coupled by separate ones of N of the N+1 hybrid couplers to N pairs of matched band pass filters. The outputs of the filters are combined in a signal combiner to form a pair of quadrature phase multiplexed channel signals that are converted to a single multiplexed output signal by the remaining hybrid coupler. A selector mechanism operates to select one of the N inputs for connection to a load for test purposes.

20 Claims, 8 Drawing Sheets

SIGNAL MULTIPLEXER AND METHOD

This application is a continuation-in-part of application, Ser. No. 09/451,000, filed on Nov. 29, 1999, now U.S. Pat. No. 6,580,729 for "SIGNAL MULTIPLEXER AND METHOD", in the names of Brett J. Grandchamp and William A. DeCormier and assigned to the assignee of this application.

BACKGROUND OF THE INVENTION

1. Field of the Invention

This invention relates to an apparatus and a method for multiplexing signals of different frequency bands, and, in particular, to a low cost signal multiplexer and method that exhibits substantially no reflected energy to the input ports.

2. Description of the Prior Art

Prior art multiplexers include a branch combiner, a star combiner and a manifold combiner. These signal combiners have a serious disadvantage in that they do not present a constant impedance to the inputs that receive the signals. That is, out of band energy is reflected back to the inputs.

Another prior art multiplexer presents a constant impedance to the input. An example of this style of multiplexer is shown in U.S. Pat. No. 4,029,902. As shown in this patent, this style of multiplexer typically has a pair of matched filters, two hybrids and a load for each signal channel. The filtered output of each channel is fed as an input to the next channel and so on. Although reflected energy to the channel inputs is nil, the cost is high because 2N hybrids are required, where N is the number of signals or channels to be multiplexed. Moreover, the bandwidth is limited to the short circuit VSWR (voltage standing wave ratio) of the output hybrid. The short circuit VSWR is dependent on the amplitude balance of the output hybrid of each channel. In coax hybrids, the amplitude balance is controlled in the design of the hybrid by the use of multiple quarter wave coupled sections, which are power limited. In wave guide hybrids, which can take more power, the amplitude balance is limited by the inability to produce multiple quarter wave coupled sections. Consequently, when the bandwidth causes the amplitude ripple to exceed 0.085dB, the short circuit VSWR exceeds 1.04:1. The sum of the VSWR of the individual channels quickly accumulates until the system exceeds a VSWR of 1.10:1that is required by the transmitters.

When installed, a television broadcast system needs to be capable of testing the transmitter of any channel without disturbing broadcast activity of any other channel. The tests are conducted, for example, for optimizing transmitter performance as well as for compliance with the requirements of governmental regulatory agencies, such as the Federal Communications Commission.

There is a need for a low cost constant input impedance multiplexer as well as a need for a constant impedance multiplexer that is not bandwidth limited by the quality or power capacity of components, such as hybrid couplers.

There is also a need for a multiplexer with a test capability for any selected channel without disturbing broadcast activity on other channels.

SUMMARY OF THE INVENTION

A multiplexer according to the invention uses only N+1 hybrid couplers to multiplex N signals, while limiting reflected energy to substantially zero at the inputs that receive the signals being multiplexed. The multiplexer includes N hybrid couplers for converting each of the N signals into a pair of quadrature phase signals. There is a pair of matched band pass filters for each signal or channel that filter the quadrature phase signals. The pairs of filtered quadrature phase signals for all the channels are combined in a signal combiner to produce a pair of N channel multiplexed quadrature phase signals. A single output hybrid coupler converts the pair of N frequency band multiplexed quadrature phase signals into a single multiplexed signal.

Each of the N hybrid couplers has a first port that receives one of the N signals. The remaining ports of the N hybrid couplers are connected in a manner to prevent a reflection of energy to the corresponding first port. To this end, each of the hybrid couplers has a second port connected with a load, and third and fourth ports connected with separate ones of the associated pair of matched band pass filters, whereby out of band energy reflected from the band pass filters is steered to the load.

The signal combiner includes a first signal combiner for combining all of the filtered quadrature phase signals of one of the phases and a second signal combiner for combining all of the filtered quadrature phase signals of the other phase. In one embodiment, the first and second signal combiners are first and second manifolds, respectively.

The method according to the invention, converts each of the N signals into a pair of quadrature phase signals. The quadrature phase signals are then filtered. The N pairs of filtered quadrature phase signals are combined to produce a pair of N frequency band multiplexed quadrature phase signals. The pair of N frequency band multiplexed quadrature phase signals are then converted into a single multiplexed signal.

In an alternate embodiment of the invention, the signal multiplexer includes a selector mechanism that selects one of the N signals. The N signals are filtered and combined to produce a pair of multiplexed quadrature phase signals as described above for the first embodiment. However, the output hybrid coupler converts the pair of multiplexed quadrature phase signals into a first multiplexed signal that contains the frequency band of the selected signal and a second multiplexed signal that contains the frequency bands of the non-selected signals. This allows the transmitter of the selected signal to be tested with measurements of the first multiplexed signal.

BRIEF DESCRIPTION OF THE DRAWING

Other and further objects, advantages and features of the present invention will be understood by reference to the following specification in conjunction with the accompanying drawings, in which like reference characters denote like elements of structure and.

DESCRIPTION OF THE INVENTION

Figure 1:
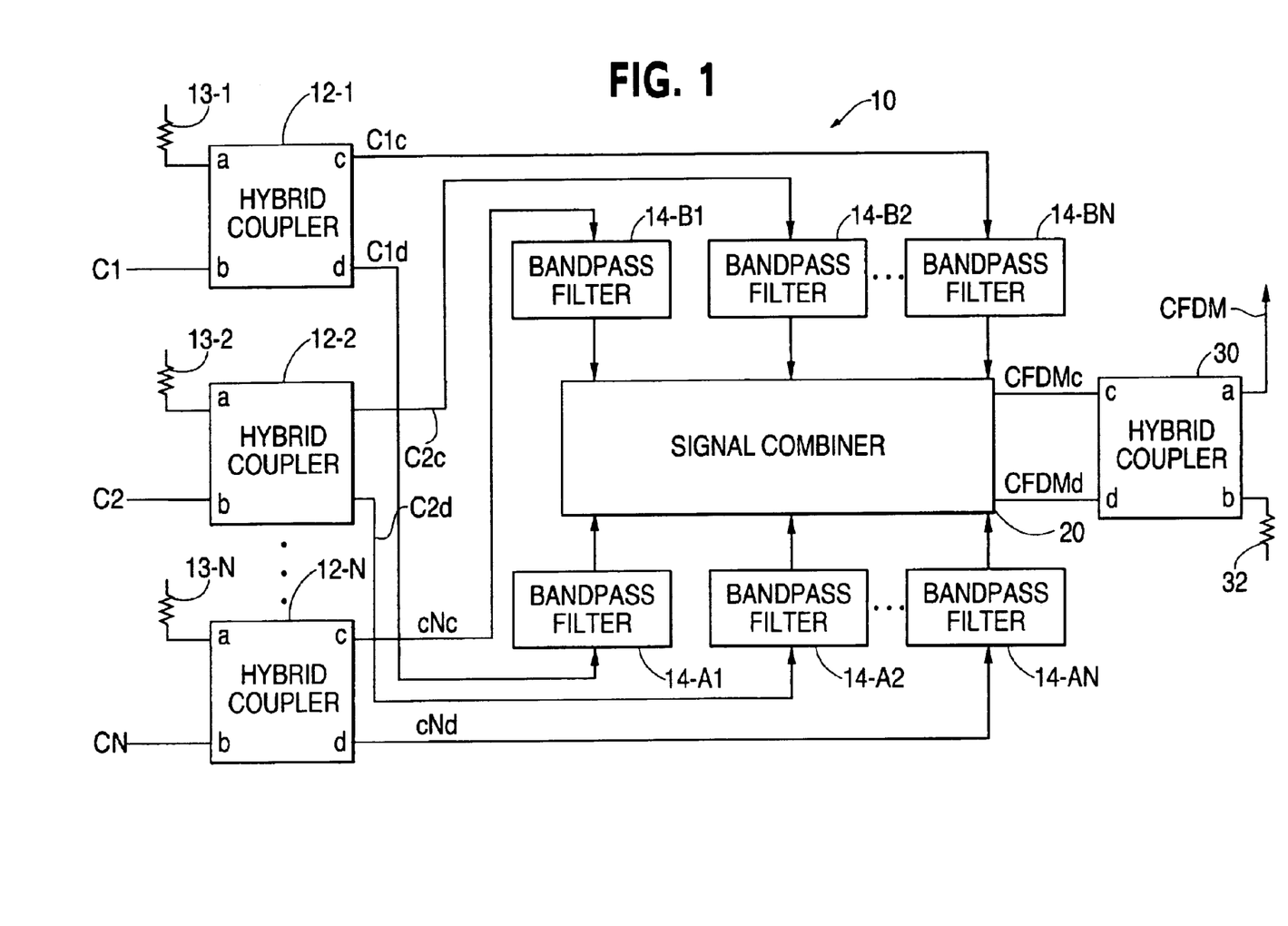
FIG. 1 is a schematic block diagram of a multiplexer according to the present invention.
Figure 2:
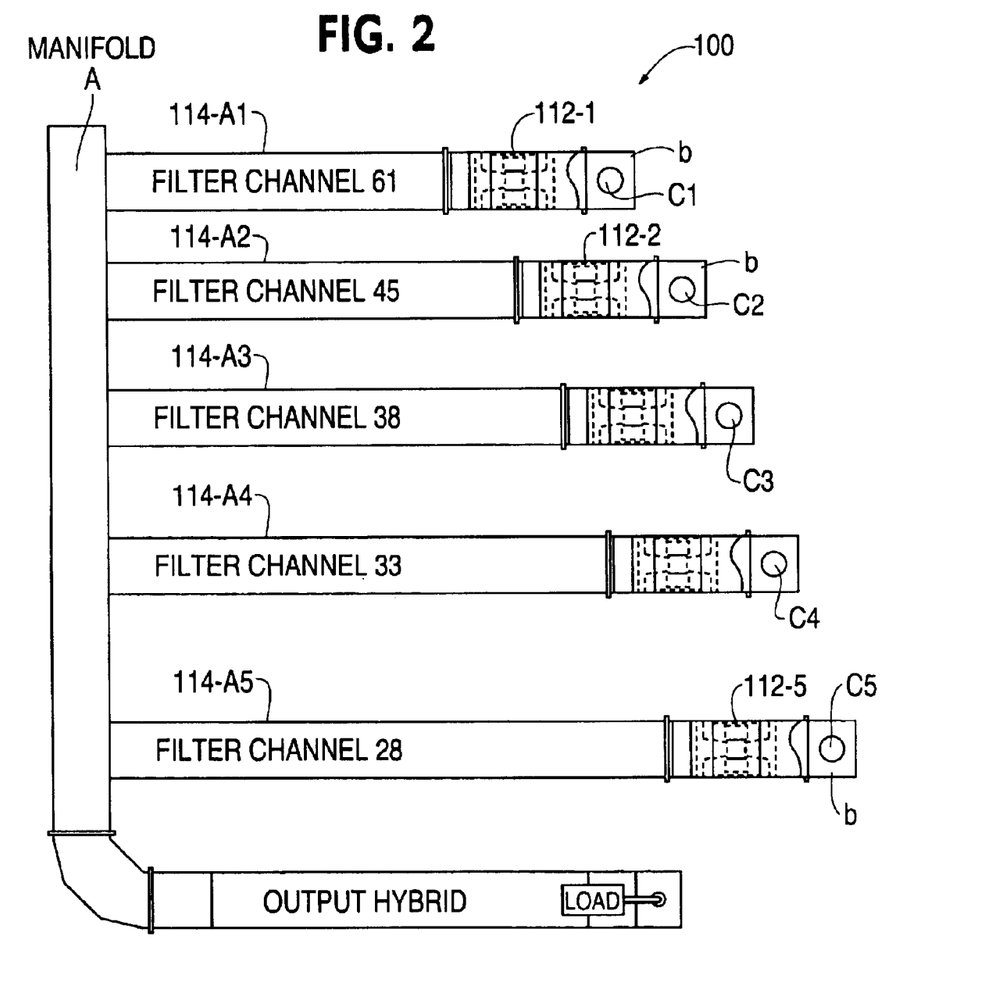
FIG. 2 is a top view of a manifold style multiplexer for the FIG. 1 multiplexer.

Referring to FIG. 1, there is shown a multiplexer 10 according to the present invention. Multiplexer 10 includes N input hybrid couplers 12-1 and 12-2 through 12-N, where N is two or more, and an output coupler 30 for a total of N–1 hybrid couplers. Hybrid couplers 12-1, 12-2 and 12-N receive input signals C1, C2 and CN, respectively. Signals C1, C2 and CN each have frequencies in a different frequency band or channel and constitute the signals to be multiplexed by multiplexer 10 to a frequency division multiplexed output signal CFDM at output hybrid coupler 30.

The frequencies of signals C1, C2 and CN are dependent on the application in which multiplexer 10 is used. For example, the frequency range for signals C1 through CN is 50 through 806 MHz for television applications and 88 through 108 MHz for FM applications. Those skilled in the art will appreciate that multiplexer 10 can be used in other applications that use other parts of the frequency spectrum.

Hybrid couplers 12-1 through 12-N and 30 are substantially identical and have ports a, b, c, and d. Ports b of input hybrid couplers 12-1, 12-2 and 12-N are connected to receive input signals C1, C2 and CN, respectively. Ports a of input hybrid couplers 12-1, 12-2 and 12-N are connected to a load 13-1, a load 13-2 and a load 13-N, respectively. Input hybrid coupler 12-1 develops one half amplitude quadrature phase signals C1$c$ and C1$d$ at its ports c and d, respectively. Input hybrid coupler 12-2 develops one half amplitude quadrature phase signals C2$c$ and C2$d$ at its ports c and d, respectively. Input hybrid coupler 12-N develops one half amplitude quadrature phase signals CN$c$ and CN$d$ at its ports c and d, respectively.

Multiplexer 10 also includes a first plurality of band pass filters 14-B1 and 14-B2 through 14-BN and a second plurality of band pass filters 14-A1 and 14-A2 through 14-AN. Filters 14-A1 and 14-B1 form a matched pair in that they both have the same pass band filter characteristic that matches the frequency band of input signal C1. Similarly, filters 14-A2 and 14-B2 form a matched pair and filters 14-AN and 14-BN form a matched pair with pass band characteristics that match the frequency bands of signals C1 and CN, respectively.

Quadrature phase signal pair C1$c$ and C1$d$ are applied to matched filter pair 14-B1 and 14-A-1, respectively. Quadrature phase signal pair C2$c$ and C2$d$ are applied to matched filter pair 14-B2 and 14-A2, respectively.

Quadrature phase signal pair CN$c$ and CN$d$ are applied to matched filter pair 14-BN and 14-AN, respectively.

Multiplexer 10 also includes a signal combiner 20 that combines the filtered quadrature phase signals C1$c$, C2$c$, CN$c$, C1$d$, C2$d$ and CN$d$ to produce a quadrature phase signal pair CFDM$c$ and CFDM$d$. Quadrature phase signal pair CFDM$c$ and CFDM$d$ constitute a frequency division multiplexed signal pair for input signals C1 through CN. Quadrature phase signals CFDM$c$ and CFDM$d$ are applied to ports c and d of output hybrid coupler 30. Output hybrid coupler 30 converts quadrature phase signals CFDM$c$ and CFDM$d$ to a single frequency division multiplexed signal CFDM at its output port a. Output port b of output hybrid coupler 30 is connected to a load 32.

Any out of band energy rejected by filters 14-A1 through 14-AN and 14-B1 through 146-BN is reflected back to input hybrid couplers 12-1 through 12-N and absorbed in loads 13-1 through 13-N. For example, out of band energy reflected by matched filter pair 14-1 and 16-1 is absorbed in load 13-1. Thus, multiplexer 10 presents a constant impedance to the transmitters that provide signals C1 through CN.

Signal combiner 20 may be any suitable signal combiner that combines signals of different frequency bands into a frequency division multiplexed signal. For example, signal combiner 20 may be implemented in a manifold style combiner or a star point style combiner.

Figure 3:
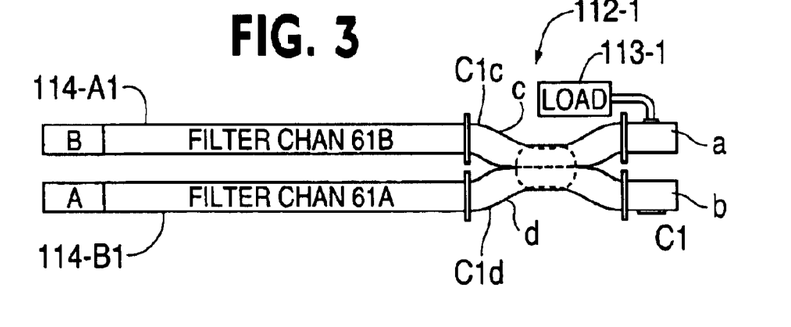
FIG. 3 is an elevation view of the upper end of FIG. 2.
Figure 4:
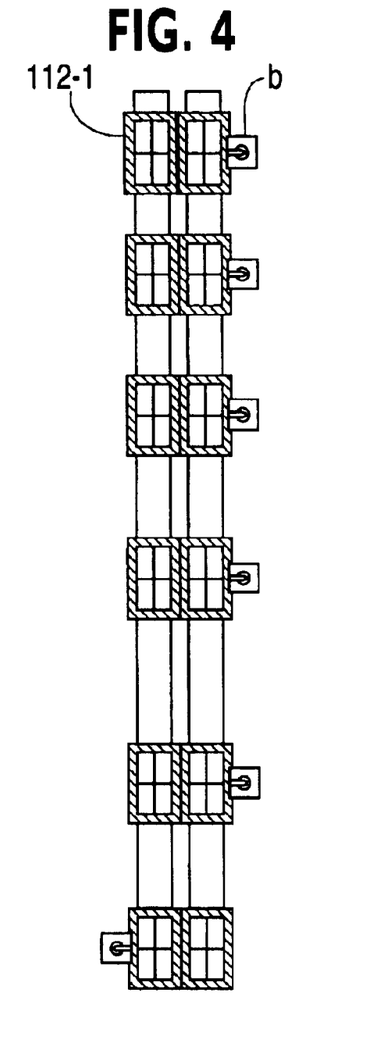
FIG. 4 is a side view of FIG. 2.
Figure 5:
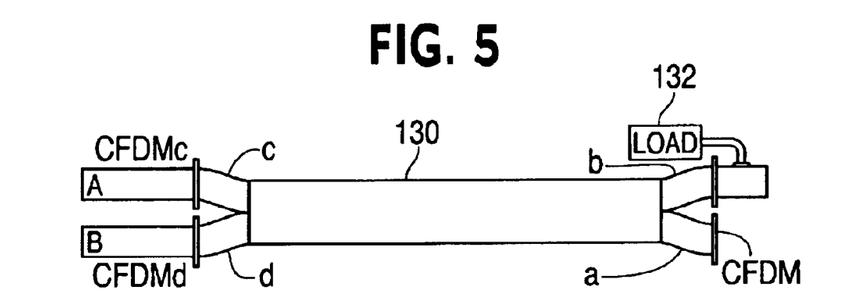
FIG. 5 is an elevation view of the lower end of FIG. 2.

Referring to FIGS. 2 through 5, the FIG. 1 multiplexer is shown in a manifold style multiplexer 100 that is configured to multiplex five channel signals C1 through C5 for television channels 28, 33, 38, 45 and 61. Manifold style multiplexer 100 has input hybrid couplers 112-1 through 112-5 for receiving channel signals C1 through C5 at their respective ports b. Ports a of each input hybrid coupler 112-1 through 112-5 are coupled to separate dummy loads such as load 113-1 shown in FIG. 3 for input hybrid coupler 112-1. Ports c of input hybrid couplers 112-1 through 112-5 are connected to a set of band pass filters, such as band pass filters 114-A1 and 114-B1 as shown in FIGS. 3 for input hybrid coupler 112-1. Input hybrid couplers 112-1 through 112-5 have their ports d connected to separate ones of another set of band pass filters, such as band pass filter 114-A1 shown in FIG. 3 for hybrid coupler 112-1.

Band pass filters 114-B1 through 114-B5 have their outputs connected to a manifold 120A for combining the filtered quadrature phase signals, such as signal C1$c$ for band pass filter 114-B1 shown in FIG. 3. Band pass filters 114-A1 through 114-A5 have their outputs connected to a manifold 120B for combining the filtered quadrature phase signals, such as signal C1$d$ for pass band filter 114-A1 shown in FIG. 3. Manifolds 120A and 120B produce at their respective outputs the quadrature phase signals CFDM$c$ and CFDM$d$ shown in FIG. 5. Manifolds 120A and 120B correspond to and perform the signal combining function as signal combiner 20 of FIG. 1.

Quadrature phase signals CFDM$c$ and CFDM$d$ are applied to ports a and b of an output hybrid 130, respectively. Port b of output hybrid 130 is connected to a load 132. Multiplexed signal CFDM is developed at port a of hybrid output coupler 130 for application to a television broadcast antenna (not shown).

Manifold style multiplexer 100 is shown as using wave guide components for input hybrid couplers 112, band pass filters 114, manifolds 120A and 120B and output hybrid coupler 130. It will be appreciated by those skilled in the art that manifold style multiplexer 100 may be implemented with any combination of wave guide and coax components.

Band pass filters 114-A1 through 114-A5 are located above band pass filters 114-B1 through 114-B5 in a stacked relationship with the stacks of filter pairs being substantially parallel to one another. Manifolds 120A and 120B are positioned in a stacked relationship substantially perpendicular to and are connected to the stacks of filters 114. Output hybrid coupler 130 is positioned substantially parallel to the stacks of filters 114 and is connected to the stacked manifolds 120A and 120B.

Figure 6:
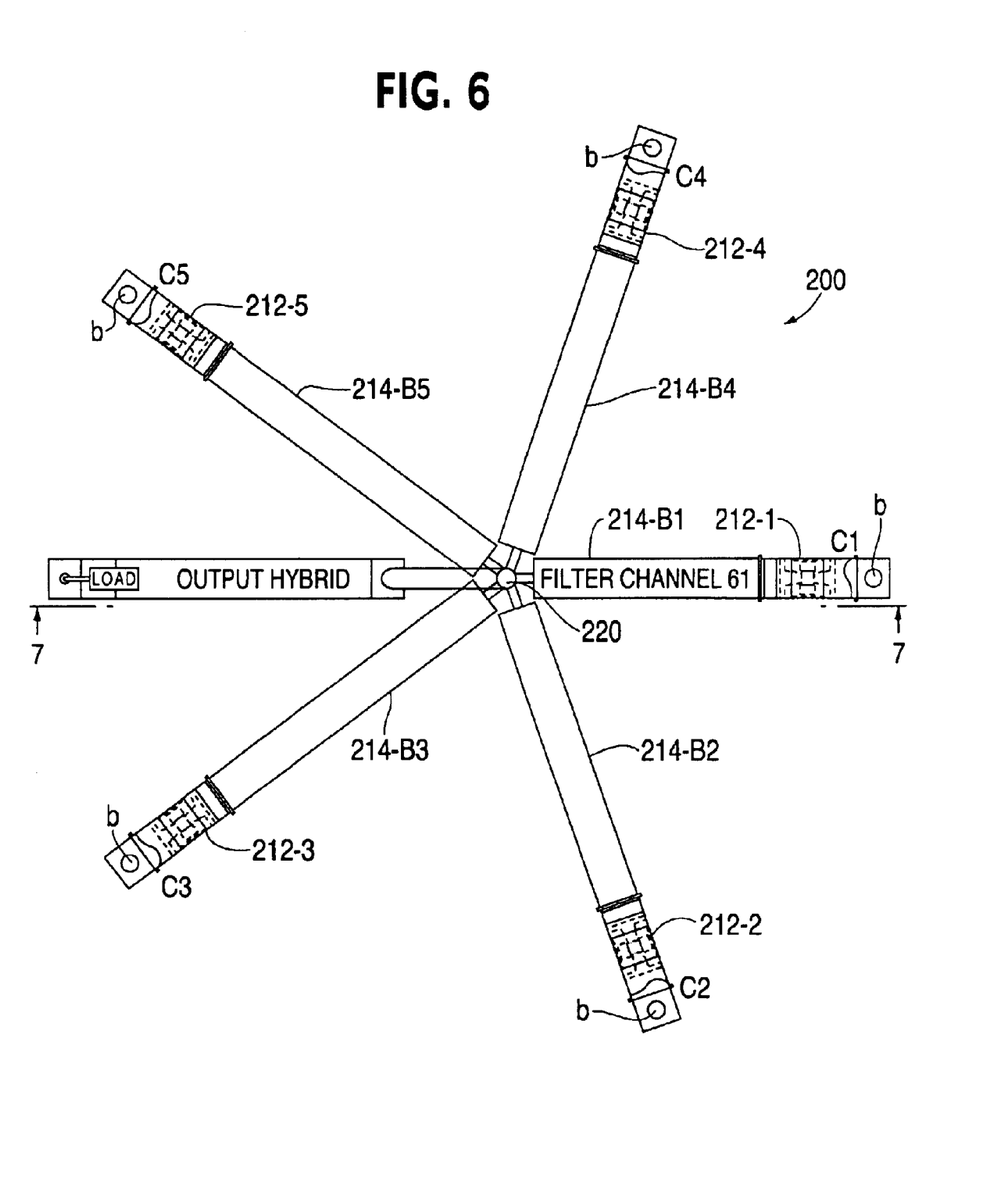
FIG. 6 is a top view of a star point style multiplexer for the FIG. 1 multiplexer.
Figure 7:
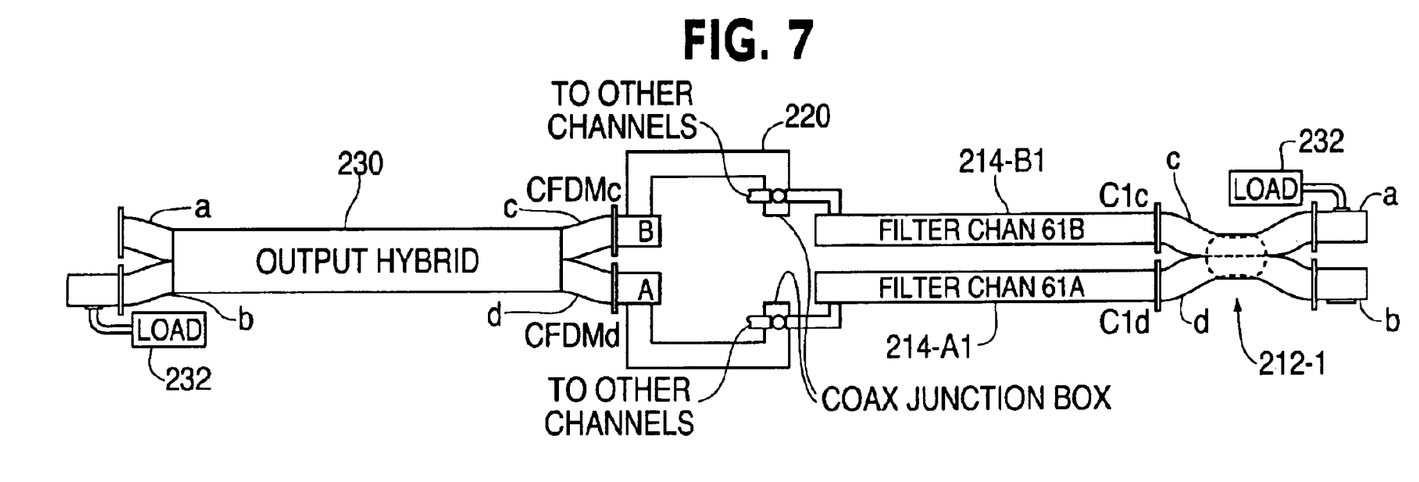
FIG. 7 is a view taken along line 7—7 of FIG. 6.

Referring to FIGS. 6 and 7, the FIG. 1 multiplexer is shown in a star point style multiplexer 200 that is configured to multiplex five channel signals C1 through C5 for five television channels, of which one is designated as channel 61. Star point multiplexer 200 has input hybrid couplers 212-1 through 212-5 coupled to receive channel signals c1 through C5 at their respective ports b. Input hybrid couplers 212-1 through 212-5 produce quadrature phase signals that are filtered in a pair of matched band pass filters, such as band pass filters 214-B1 and 214-A1 for hybrid coupler 212-1 as shown in FIG. 7. Ports a of input hybrid filters 212-1 through 212-5 are connected to dummy loads, such as dummy load 232 shown in FIG. 7 for input hybrid coupler 212-1. Ports c of input hybrid couplers 212-1 through 212-5 are connected to separate ones of a set of band pass filters, such as band pass filter 214-A1 shown in FIG. 7 for input hybrid coupler 212-1. Ports d of input hybrid couplers 212-1 through 212-5 are connected to separate ones of a set of band pass filters, such as band pass filter 214-B1 shown in FIG. 7 for input hybrid coupler 212-1.

Band pass filters 214-A1 through 214-A5 are located above band pass filters 214-B1 through 214-B5 in a stacked relationship. The stacks of filter pairs and output hybrid coupler 230 are configured in a star point geometry and are connected with coax junction box 220 for combining the filtered quadrature phase signals, such as signals C1c and C1d for band pass filters 214-B1 and 214-A1 shown in FIG. 7. Coax junction box 220 combines the filtered channel quadrature phase signals to produce at its outputs the quadrature phase signals CFDMc and CFDMd shown in FIG. 7.

Quadrature phase signals CFDMc and CFDMd are applied to ports c and d of an output hybrid coupler 230, respectively. Port b of output hybrid coupler 230 is connected to a load 232. Multiplexed signal CFDM is developed at port a of output hybrid coupler 230 for application to a television broadcast antenna (not shown).

Star point style multiplexer 200 is shown as using wave guide components for input hybrid couplers 212, band pass filters 214, and output hybrid coupler 230. It will be apparent to those skilled in the art that these components can alternatively be constructed with coax components.

Figure 8:
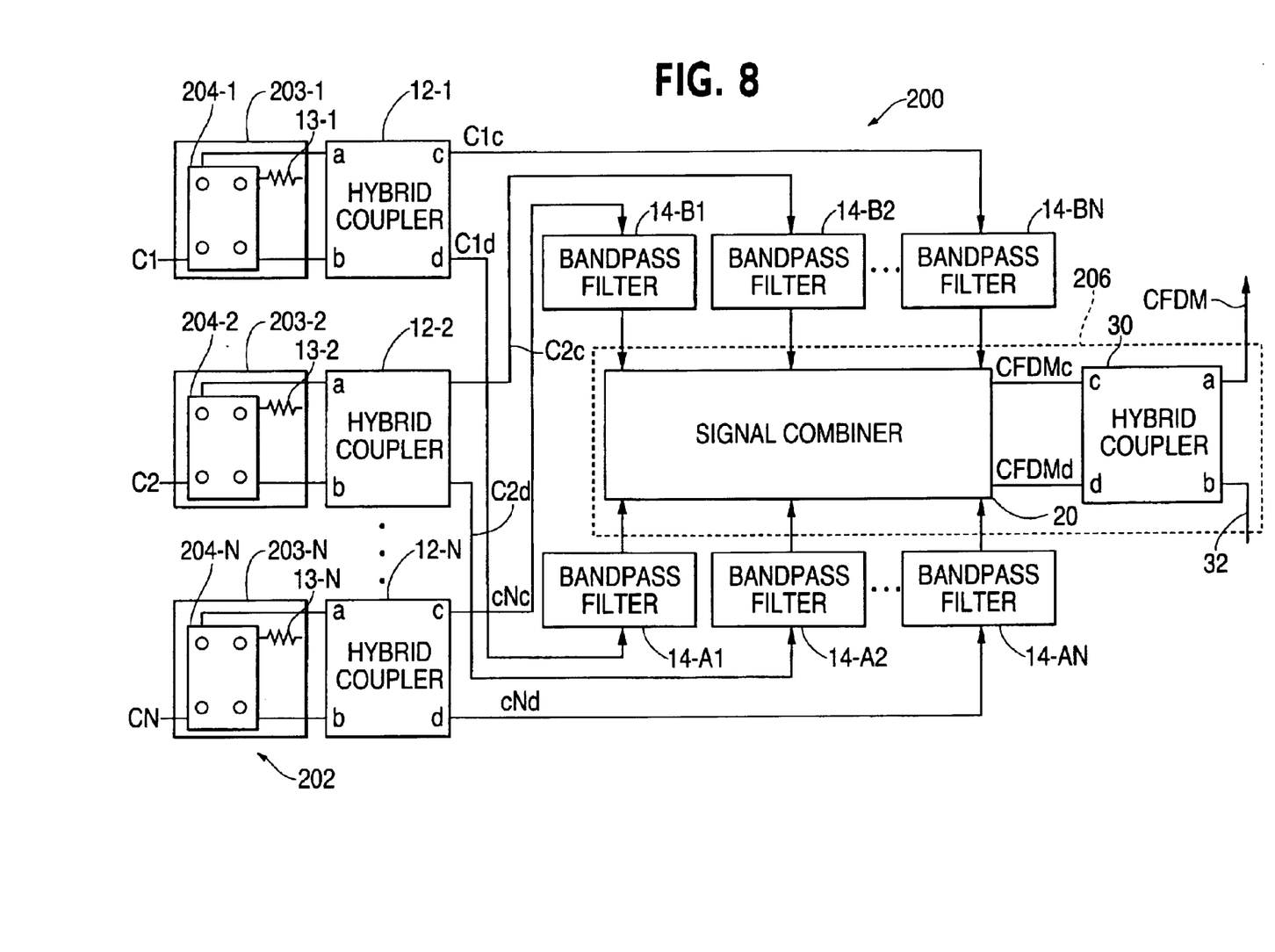
FIG. 8 is a schematic block diagram of a multiplexer of an alternate embodiment of the present invention.

Referring to FIG. 8, a signal multiplexer 200 has several identical parts to signal multiplexer 10 of FIG. 1 that, therefore, bear the same reference numerals. Multiplexer 200 additionally includes a selector mechanism 202 that includes N selectors 203-1 and 203-2 through 203-N. Selectors 203-1 and 203-2 through 203-N include switches 204-1 and 204-2 through 204-N, respectively, that are associated with separate ones of hybrid couplers 12-1 through 12-N, input signals C1 through CN and input loads 13-1 through 13-N.

Each switch 204-1 through 204-N is a double pole double throw switch that interconnects the associated signal and load with ports a and b of the associated hybrid coupler. For example, switch 204-1 when in a first position, connects input signal C1 and load 13-1 to ports b and a, respectively. When in a second position, switch 204-1 connects input signal C1 and load 13-1 to ports a and b, respectively.

Signal multiplexer 200 has a signal assembling mechanism 206 that includes signal combiner 20 and output hybrid coupler 30. Signal combiner 20 and output hybrid coupler 30 operate to assemble the individual filtered signal outputs of bandpass filters 14 into composite signal CFDM.

When selector mechanism 202 is operated to connect signals C1 through CN and loads 13-1 through 13-N to ports b and a of hybrid couplers 12-1 through 12-N, signal multiplexer 200 operates identically to signal multiplexer 10 of FIG. 1. For this mode of operation, signals C1 through CN are multiplexed to appear as composite signal CFDM for application to an antenna.

When selector mechanism 202 is operated to select one of the N channels for testing, the signal of the selected channel is multiplexed to output load 32 and the signals of the remaining channels are multiplexed as a composite signal to an antenna. For example, when selector 203-1 is operated to select the transmitter of signal C1 for testing, signal C1 is routed by multiplexer 200 to output load 32 without substantially affecting the multiplexing of the remaining signals C2 through CN to the antenna. For this selected case, the phases of the equally split signals in bandpass filters 14-A1 and 14-B1 are reversed from the normal operation. Thus, the multiplexed signal CFDM at port a of output hybrid coupler 30 contains the frequency bands of the non-selected signals and the multiplexed signal at port b of output hybrid coupler 30 contains just the frequency band of the selected signal C1.

The net result is that the selected signal C1 is isolated from the other non-selected signals. Test procedures may then be conducted for signal C1 with measurements of the signal in output load 32 without interrupting service for any of the non-selected signals. Any multiple of signals can be selected and the test load 32 can be another antenna or any other device capable of accepting the signal.

Figure 9:
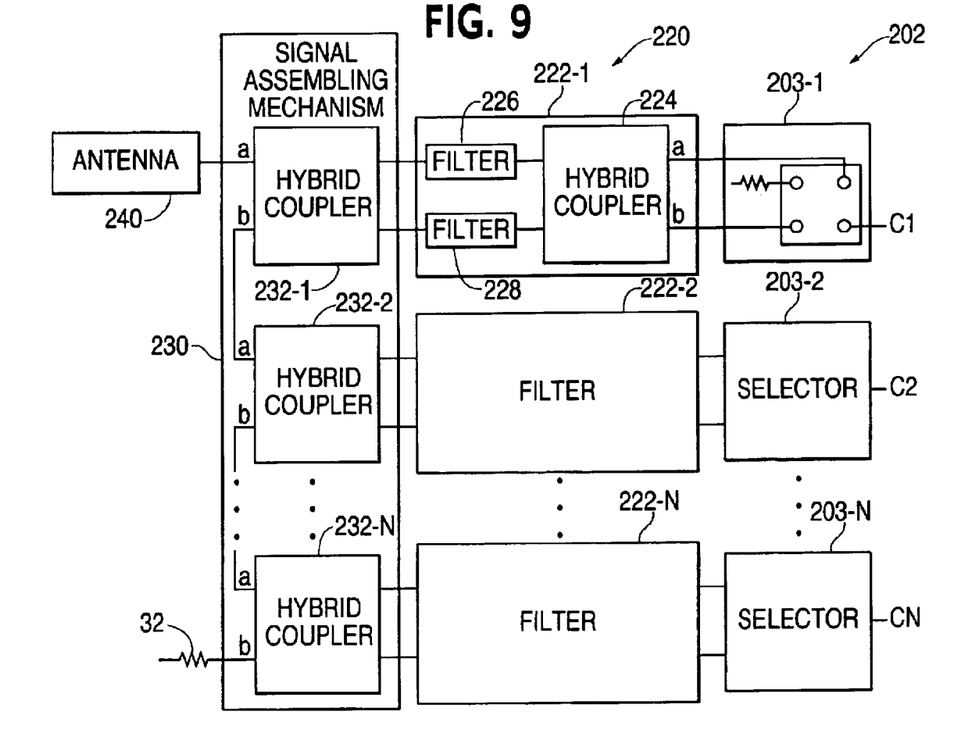
FIG. 9 is a schematic block diagram of a multiplexer of an alternate embodiment of the present invention.

Referring to FIG. 9, a signal multiplexer 220 has a selector mechanism 202, a filter mechanism 222 and signal assembling mechanism 230. Selector mechanism 202 operates to select none or one or more of signals C1 through CN for connection to load 32. The non-selected signals are applied to an antenna 240 as a composite signal. Filter mechanism 220 includes substantially identical filters 222-1 and 222-2 through 222-N. For example, filter 222-1 includes a hybrid coupler 224 and a pair of filters 226 and 228. Selector 203-1 is operable to connect signal C1 to either port a or port b of hybrid coupler 224. If connected to port b, signal C1 is not selected for test and is routed to antenna 240. If selector 203-1 connects signal C1 to port a, signal C1 is selected for test and is routed to load 32.

Signal assembling mechanism 230 is operable to assemble the filtered signals C1 through CN for application to either antenna 240 or to load 32. Thus, signal assembling mechanism 220 assembles the non-selected ones of signals C1 through CN into a composite signal that contains the frequency bands of the non-selected signals for application to antenna 240. Signal assembling mechanism 230 also assembles any selected ones of signals C1 through CN into a composite signal that contains the frequency bands of the selected signals for application to load 32. Signal assembling mechanism includes N hybrid coupler 232-1 and 232-2 through 232-N for the filtered output signals C1 and C2 through CN, respectively. The output ports a and b of hybrid couplers 232-1 through 232-N are connected in a daisy chain configuration with port a of hybrid coupler 232-1 being connected to antenna 240 and port b of hybrid coupler 232-N being connected to load 32.

Figure 10:
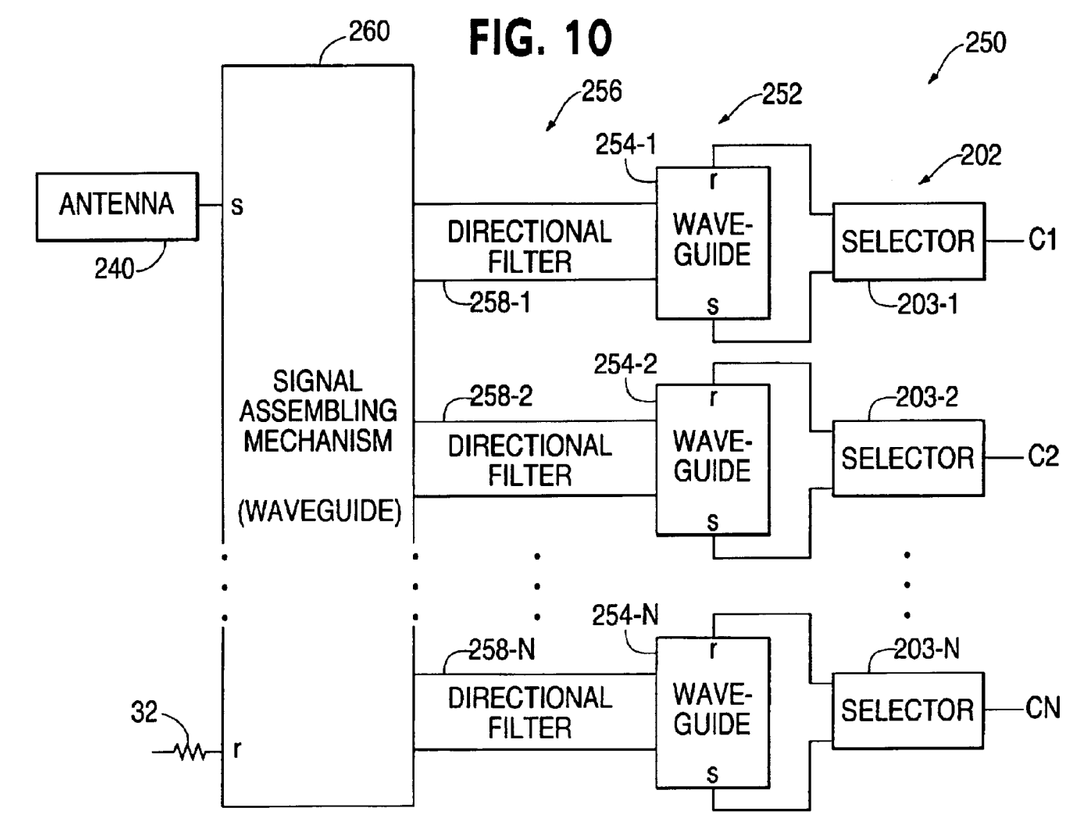
FIG. 10 is a schematic block diagram of a multiplexer of an alternate embodiment of the present invention.

Referring to FIG. 10, a signal multiplexer 250 has a selector mechanism 202, a wave guide mechanism 252, a filter mechanism 256 and signal assembling mechanism 260. Selector mechanism 202 operates to select none or one or more of signals C1 through CN for connection to load 32. The non-selected signals are applied to antenna 240 as a composite signal. Filter mechanism 256 includes substantially identical directional filters 258-1 and 258-2 through 258-N. Wave guide mechanism 252 includes wave guides 254-1 and 254-2 through 254-N connected with selectors 203-1 and 203-2 through 203-N, respectively. Wave guides 254-1 through 254-N have their outputs connected to directional filters 258-1 through 258-N, respectively.

The operation of each selector 203 and wave guide 254 is substantially identical, For example, selector 203-1 is operable to connect signal C1 to either port r or port s of wave guide 254-1. If connected to port s, signal C1 is not selected for test and is routed to antenna 240. If selector 203-1 connects signal C1 to port r, signal C1 is selected for test and is routed to load 32.

Signal assembling mechanism 260 is operable to assemble the filtered signals C1 through CN for application to either antenna 240 or to load 32. Thus, signal assembling mechanism 260 assembles the non-selected ones of signals C1 through CN into a composite signal that contains the frequency bands of the non-selected signals for application to antenna 240. Signal assembling mechanism 260 also assembles any selected ones of signals C1 through CN into a composite signal that contains the frequency bands of the selected signals for application to load 32. Signal assembling mechanism 260 is, for example, a wave guide having an s port connected to antenna 240 and an r port connected to load 32.

The present invention having been thus described with particular reference to the preferred forms thereof, it will be obvious that various changes and modifications may be made therein without departing from the spirit and scope of the present invention as defined in the appended claims.

What is claimed is:

1. A method of multiplexing N signals, N being two or more, each signal having a different frequency band, the method comprising:
   (a) selecting one of said N signals;
   (b) converting each of the N signals into a pair of quadrature phase signals;
   (c) filtering the quadrature phase signals of a first one of the quadrature phases and filtering the quadrature signals of the second one of the quadrature phases to produce a pair of filtered quadrature phase signals for each frequency band;
   (d) combining the filtered quadrature phase signals of the first and second phases to produce a pair of multiplexed quadrature phase signals for said N frequency bands; and
   (e) converting the multiplexed quadrature phase signals into a first multiplexed signal that contains the frequency band of the selected signal and a second multiplexed signal that contains the frequency bands of the remaining non-selected signals.

2. The method of claim 1, wherein step (c) filters out of band energy from the quadrature phase signal of the first phase and from the quadrature phase signal of the second phase.

3. The method of claim 2, wherein the N signals are received at N inputs, respectively, and wherein step (b) prevents a reflection of-energy to the N inputs.

4. The method of claim 3, further comprising (f) connecting the first multiplexed signal to a load and the second multiplexed signal to an antenna.

5. The method of claim 3, wherein each of the N inputs has first and second ports, wherein the selected one of the N signals is received at a first port of one of the N inputs and the remainder of the N signals are received at separate ones of the other second ports.

6. A signal multiplexer for multiplexing N signals, N being two or more, each signal having a different frequency band, the signal multiplexer comprising:
   N hybrid couplers that convert each of the N signals into a pair of quadrature phase signals;
   a filter that filters the quadrature signals of a first one of the quadrature phases and that filters the quadrature signals of the second one of the quadrature phases to produce a pair of filtered quadrature phase signals for each frequency band;
   a selector mechanism that selects one of said N signals;
   a signal combiner that combines the filtered quadrature phase signals of the first phase and filtered quadrature phase signals of the second phase to produce a pair of multiplexed quadrature phase signals; and
   an output hybrid coupler that converts the first and second pairs multiplexed quadrature phase signals into a first multiplexed signal that contains the frequency band of the selected signal and a second multiplexed signal that contains the frequency bands of the non-selected signals.

7. The signal multiplexer of claim 6, wherein the filter includes N pairs of matched band pass filters tuned to different ones of the frequency bands, one of said matched band pass filters filtering the quadrature phase signal of the first phase and the other of said matched band pass filters filtering the quadrature phase signal of the second phase.

8. The signal multiplexer of claim 7, wherein each of the N hybrid couplers has a first and a second port, one of said first and second ports receiving one of the N signals, and wherein each of the N hybrid couplers is connected in a manner to prevent a reflection of energy to said one of the first and second ports.

9. The signal multiplexer of claim 8, further comprising N input loads for said N hybrid couplers, wherein said selector mechanism couples the selected one of the N signals to the first port of the corresponding hybrid coupler and the second port thereof to one of the N loads and couples the remaining ones of the N signals to separate ones of the second ports of the remaining hybrid couplers and the second ports thereof to the remaining ones of the input loads, whereby out of band energy reflected from the band pass filters is steered to said input loads.

10. The signal multiplexer of claim 9, wherein the first multiplexed signal is connected to an output load and the second multiplexed signal is connected to an antenna.

11. A method of multiplexing N signals, N being two or more, each signal having a different frequency band, the method comprising:
   (a) selecting one of said N signals;
   (b) filtering said N signals to produce at least one filtered signal for each frequency band; and
   (c) assembling the filtered signals into a first multiplexed signal that contains the frequency band of the selected signal and a second multiplexed signal that contains the frequency bands of the remaining non-selected signals.

12. The method of claim 11, wherein the N signals are received at N inputs, respectively, wherein each of the N inputs has first and second ports, wherein the selected one of the N signals is received at a first port of one of the N inputs and the remainder of the N signals are received at separate ones of the second ports of the other N inputs.

13. The method of claim 12, further comprising (d) connecting the first multiplexed signal to a load and the second multiplexed signal to an antenna.

14. A signal multiplexer for multiplexing N signals, N being two or more, each signal having a different frequency band, the signal multiplexer comprising:
   a filter that filters said N signals to produce a filtered signal for each frequency band;
   a selector mechanism that selects one of said N signals; and
   a signal assembling mechanism that assembles the filtered signals into a first multiplexed signal that contains the frequency band of the selected signal and a second multiplexed signal that contains the frequency bands of the non-selected signals.

15. The signal multiplexer of claim 14, further comprising N inputs with each input having first and second ports, and wherein said selector mechanism connects said selected signal to the first port of one of said inputs and the non-selected signals to the second ports of the remaining ones of said N inputs.

16. The signal multiplexer of claim 15, wherein the first multiplexed signal is connected to an antenna and wherein the second multiplexed signal is connected to a load.

17. The signal multiplexer of claim 16, wherein said N inputs are inputs of N hybrid couplers.

18. The signal multiplexer of claim 17, wherein said signal assembling mechanism includes a signal combiner and a single output hybrid coupler that assemble said filtered signals to form said first and second multiplexed signals.

19. The signal multiplexer of claim 17, wherein said signal assembling mechanism includes N output hybrid couplers connected in a daisy chain to form said first and second multiplexed signals.

20. The signal multiplexer of claim 16, wherein said N inputs are inputs of N wave guides that are coupled to said filter, and wherein said signal assembling mechanism includes a wave guide that assembles said filtered signals to form said first and second multiplexed signals.

* * * * *